United States Patent
Zhang et al.

(10) Patent No.: US 10,141,838 B2
(45) Date of Patent: Nov. 27, 2018

(54) FREQUENCY JITTERING CONTROL CIRCUIT AND METHOD

(71) Applicant: Delta Electronics (Shanghai) Co., Ltd., Shanghai (CN)

(72) Inventors: Xing-Hua Zhang, Shanghai (CN); Xiao-Ping Fu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 265 days.

(21) Appl. No.: 14/673,861

(22) Filed: Mar. 30, 2015

(65) Prior Publication Data

US 2015/0326116 A1  Nov. 12, 2015

(30) Foreign Application Priority Data

May 9, 2014  (CN) .......................... 2014 1 0195832

(51) Int. Cl.
| | |
|---|---|
| *H02M 1/44* | (2007.01) |
| *H02M 3/335* | (2006.01) |
| *H02M 3/156* | (2006.01) |
| *H02M 1/00* | (2006.01) |

(52) U.S. Cl.
CPC ............. *H02M 1/44* (2013.01); *H02M 3/156* (2013.01); *H02M 3/33523* (2013.01); *H02M 3/33507* (2013.01); *H02M 2001/0025* (2013.01)

(58) Field of Classification Search
CPC .. H02M 3/156; H02M 3/335; H02M 3/33507; H02M 3/33523; H02M 3/33546; H02M 2001/0025; H02M 2001/0058; H02M 1/14; H02M 1/143; H02M 1/44; H03K 7/08; H03K 3/017; H03K 3/84
See application file for complete search history.

(56) References Cited

U.S. PATENT DOCUMENTS

| | | | |
|---|---|---|---|
| 4,037,164 A | * | 7/1977 | Pickton .................... H03K 3/78 327/178 |
| 5,929,620 A | | 7/1999 | Dobkin et al. |
| 6,249,876 B1 | | 6/2001 | Balakrishnan et al. |
| 7,289,582 B2 | | 10/2007 | Jang et al. |
| 7,782,036 B1 | * | 8/2010 | Wong .................... H02M 3/156 323/282 |

(Continued)

FOREIGN PATENT DOCUMENTS

| | | |
|---|---|---|
| CN | 103384117 A | 11/2013 |
| TW | 201134076 A | 10/2011 |

*Primary Examiner* — Timothy J Dole
*Assistant Examiner* — Ivan Laboy Andino
(74) *Attorney, Agent, or Firm* — CKC & Partners Co., Ltd.

(57) ABSTRACT

A frequency jittering control circuit includes a frequency jittering circuit, a feedback compensation circuit, a comparator and a control circuit. The frequency jittering circuit generates a frequency jittering signal. The feedback compensation circuit generates a feedback compensation signal in response to the frequency jittering signal and an output signal. The comparator outputs a comparison output signal according to the feedback compensation signal and an oscillation signal. The control circuit outputs a frequency jittering control signal for switching a main switch in a power supply apparatus, according to the comparison output signal, such that the power supply apparatus correspondingly generates the output signal.

13 Claims, 7 Drawing Sheets

(56) References Cited

U.S. PATENT DOCUMENTS

| | | | |
|---|---|---|---|
| 2005/0253636 A1 | 11/2005 | Yang et al. | |
| 2007/0103137 A1 | 5/2007 | Yang | |
| 2008/0099706 A1* | 5/2008 | Cook | F15B 13/0402 251/129.01 |
| 2008/0298099 A1 | 12/2008 | Huang et al. | |
| 2009/0302911 A1* | 12/2009 | Wang | H03K 3/017 327/172 |
| 2011/0110126 A1* | 5/2011 | Morrish | H02M 1/44 363/21.18 |
| 2012/0194162 A1* | 8/2012 | Lin | H02M 1/14 323/304 |
| 2012/0275199 A1 | 11/2012 | Li et al. | |
| 2012/0300499 A1* | 11/2012 | Chang | H02M 1/36 363/16 |
| 2013/0051089 A1 | 2/2013 | Pan et al. | |
| 2013/0100715 A1* | 4/2013 | Lin | H02M 3/33507 363/21.17 |
| 2014/0085936 A1* | 3/2014 | Jin | H02M 1/44 363/16 |
| 2015/0316590 A1* | 11/2015 | Eid | G01R 19/2503 324/120 |

* cited by examiner

FREQUENCY JITTERING CONTROL CIRCUIT AND METHOD

RELATED APPLICATIONS

This application claims priority to Chinese Patent Application Serial Number 201410195832.3, filed May 9, 2014, which is herein incorporated by reference.

BACKGROUND

Technical Field

The present disclosure relates to a power supply apparatus. More particularly, the present disclosure relates to a frequency uttering control mechanism in a power supply apparatus.

Description of Related Art

In a typical power supply apparatus, a main switch controlled by a control chip is conventionally operated with a constant frequency, or operated in a threshold mode that frequency varies along with input characteristics and/or output characteristics.

However, since electro-magnetic interference (EMI) generated by the power supply apparatus operated with the constant frequency is conventionally gathered where an integer multiple of a switch frequency is applied, EMI characteristics of the power supply apparatus may be difficult to satisfy a required standard. This also results in that the power supply apparatus usually requires a EMI filtering device with larger size, thus increasing high manufacturing cost.

On the other hand, for the power supply apparatus operated in the threshold mode, with variable-frequency control or pulse frequency modulation (PFM), the power supply apparatus can be operated in various variable-frequency modes, but the frequency changes in these modes will depend on the restriction conditions such as input voltage, output voltage and so on. When an input voltage thereof is constant and an output voltage thereof is provided for a constant load, switching frequency in the aforementioned variable-frequency modes keeps constant, and this results in that EMI generated by a switch device is still gathered where an integer multiple of the switching frequency is applied.

Based on the aforementioned situation, the EMI characteristics of the power supply apparatus cannot be improved effectively in the conventional art, and moreover, adjustment cannot be made according to the real input/output of the power supply apparatus in order to effectively improve the EMI characteristics.

SUMMARY

An aspect of the present disclosure is related to a frequency jittering control circuit. The frequency jittering control circuit includes a frequency jittering circuit, a feedback compensation circuit, a first comparator, and a control circuit. The frequency jittering circuit is configured to generate a frequency jittering signal. The feedback compensation circuit is configured to detect an output signal of a power supply apparatus and configured to generate a feedback compensation signal in response to the frequency jittering signal and the output signal. The first comparator is configured to output a first comparison output signal according to the feedback compensation signal and an oscillation signal. The control circuit is configured to output a frequency jittering control signal to switch a main switch in the power supply apparatus according to the first comparison output signal, such that the power supply apparatus generates the output signal correspondingly.

Another aspect of the present disclosure is related to a frequency jittering control method. The method includes following operations. A frequency jittering signal is superimposed on a feedback signal to generate a frequency jittering feedback signal, in which the feedback signal is derived by detecting an output signal of a power supply apparatus. A frequency jittering control signal is generated correspondingly according to the frequency jittering feedback signal, for switching a main switch in the power supply apparatus, such that the power supply apparatus generates the output signal correspondingly.

Still another aspect of the present disclosure is related to a frequency jittering control method. The method includes following operations. A frequency jittering signal is superimposed on a first reference voltage signal to generate a frequency jittering reference signal. A frequency jittering control signal is generated correspondingly according to the frequency jittering reference signal and a feedback signal, for switching a main switch in a power supply apparatus, such that the power supply apparatus generates an output signal correspondingly, in which the feedback signal is derived by detecting the output signal of the power supply apparatus.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of various embodiments, with reference to the accompanying drawings as follows.

DETAILED DESCRIPTION

Figure 1A:
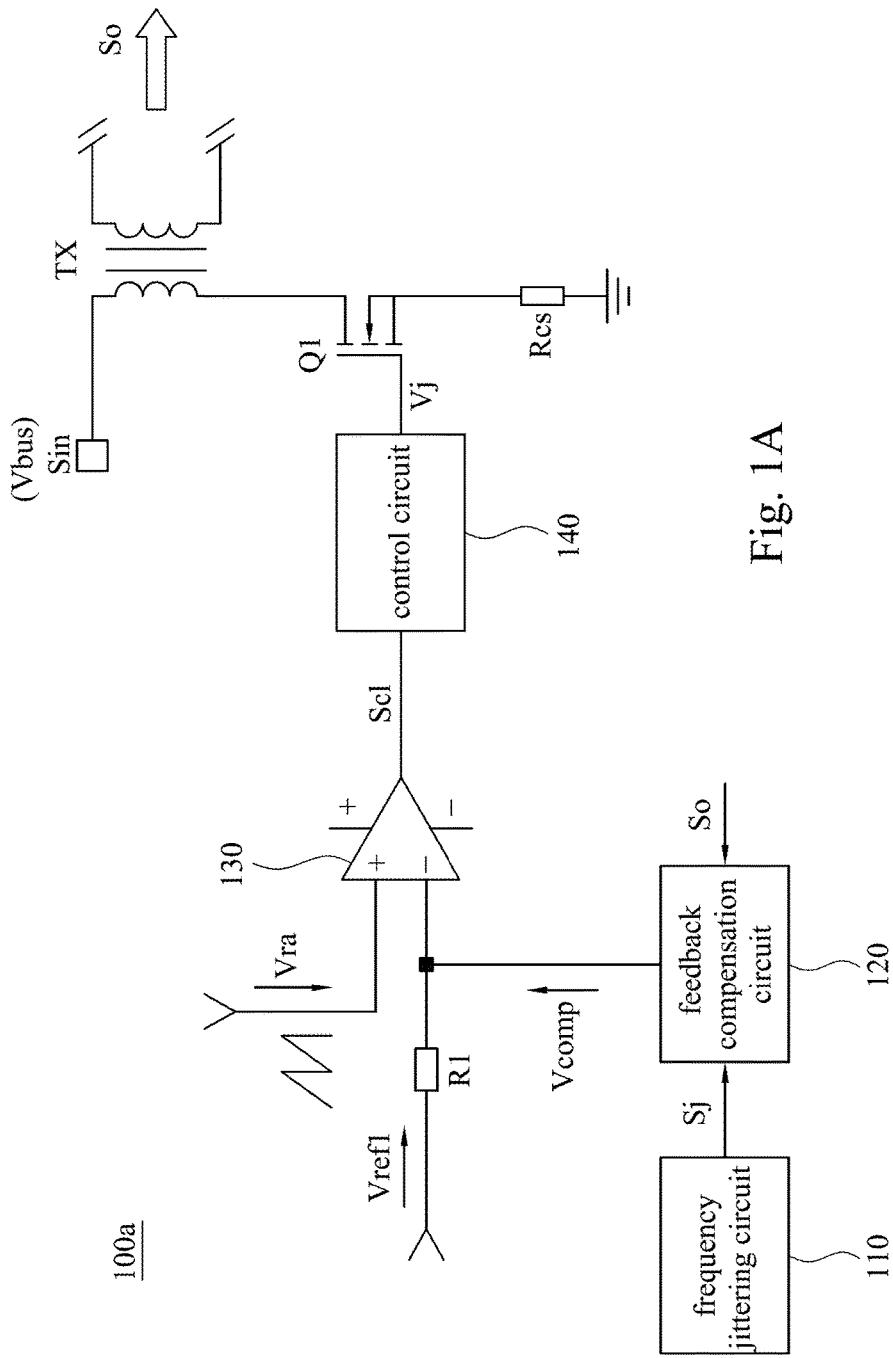
FIG. 1A is a schematic diagram of a power supply apparatus according to some embodiments of the present disclosure.

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

It will be understood that in the present disclosure, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

In some embodiments of the present disclosure, for a power supply apparatus controlled with variable frequency, a mechanism of adding low-frequency disturbance into feedback circuits to realize jittering switching frequency is disclosed, so as to improve electro-magnetic interference (EMI) characteristics of the power supply apparatus, such that the switching frequency can be jittered within a predetermined range even if an input voltage of the power supply apparatus is constant, and thus there is a dispersion effect of the switch device's EMI, which is gathered where an integer multiple of the switching frequency is applied, thereby improving EMI performance. Some embodiments of the present disclosure and specific descriptions thereof are provided below.

FIG. 1A is a schematic diagram of a power supply apparatus according to some embodiments of the present disclosure. As illustrated in FIG. 1A, the power supply apparatus 100a includes a transformer TX, a main switch Q1 (or referred to as a power switch) and a frequency jittering control circuit. The main switch Q1 is electrically coupled in series with a primary-side winding of the transformer TX, and the frequency jittering control circuit (including a control circuit 140) is configured to generate a frequency jittering control signal Vj for switching the main switch Q1, such that circuits in the power supply apparatus 100a are operated correspondingly to convert an input signal Sin into an output signal So correspondingly. The input signal Sin can be indicative of an input bus voltage Vbus, and the output signal So can be indicative of an output current signal or a corresponding output voltage signal (e.g., an output voltage signal Vo illustrated in FIG. 3) for driving a load. For circuit configurations, in one embodiment, the power supply apparatus 100a can further include a resistor Rcs, which is configured as a primary-side current detecting resistor and can be configured to perform overload protection.

In the present embodiment, the frequency jittering control circuit includes a frequency jittering circuit 110, a feedback compensation circuit 120, a comparator 130 and a control circuit 140. The frequency jittering circuit 110 is configured to generate a frequency jittering signal Sj. The feedback compensation circuit 120 is configured to detect the output signal So of the power supply apparatus 100a and configured to generate a feedback compensation signal Vcomp in response to the frequency jittering signal Sj and the output signal So. The comparator 130 is configured to output a comparison output signal Sc1 according to the feedback compensation signal Vcomp and an oscillation signal Vra. The control circuit 140 is configured to output the frequency jittering control signal Vj according to the comparison output signal Sc1, and configured to switch the main switch Q1 by the frequency jittering control signal Vj, such that the power supply apparatus 100a generates the output signal So correspondingly. In practice, the comparator 130 can be implemented by an operational amplifier (OP).

In one embodiment, an input terminal (e.g., a non-inverting input terminal) of the comparator 130 is configured to receive the oscillation signal Vra, and the other input terminal (e.g., an inverting input terminal) of the comparator 130 is configured to receive the feedback compensation signal Vcomp and a reference voltage signal Vref1. The comparator 130 is configured to compare the oscillation signal Vra with a superimposition of the feedback compensation signal Vcomp and the reference voltage signal Vref1 to generate the comparison output signal Sc1. In one specific embodiment, the oscillation signal Vra is compared with the feedback compensation signal Vcomp, and the reference voltage signal Vref1 is configured as a basis signal for signal reference.

In some embodiments, the oscillation signal Vra can be automatically generated when the main switch Q1 is turned on, or can be a voltage ramp signal generated corresponding to the current flowing through the resistor Rcs (e.g., the voltage ramp signal correspondingly generated by detecting the current flowing through the resistor Rcs).

In another embodiment, the control circuit 140 can include a RS flip-flop and a driver (not shown) (or the control circuit 140 can include a RS trigger). In an exemplary operation, after the comparator 130 compares the oscillation signal Vra with the feedback compensation signal Vcomp, the comparator 130 outputs a frequency modulation signal. The RS flip-flop receives the frequency modulation signal, and triggers the driver according to the frequency modulation signal. Then, the driver outputs the corresponding frequency jittering control signal Vj for switching the main switch Q1.

Figure 1B:
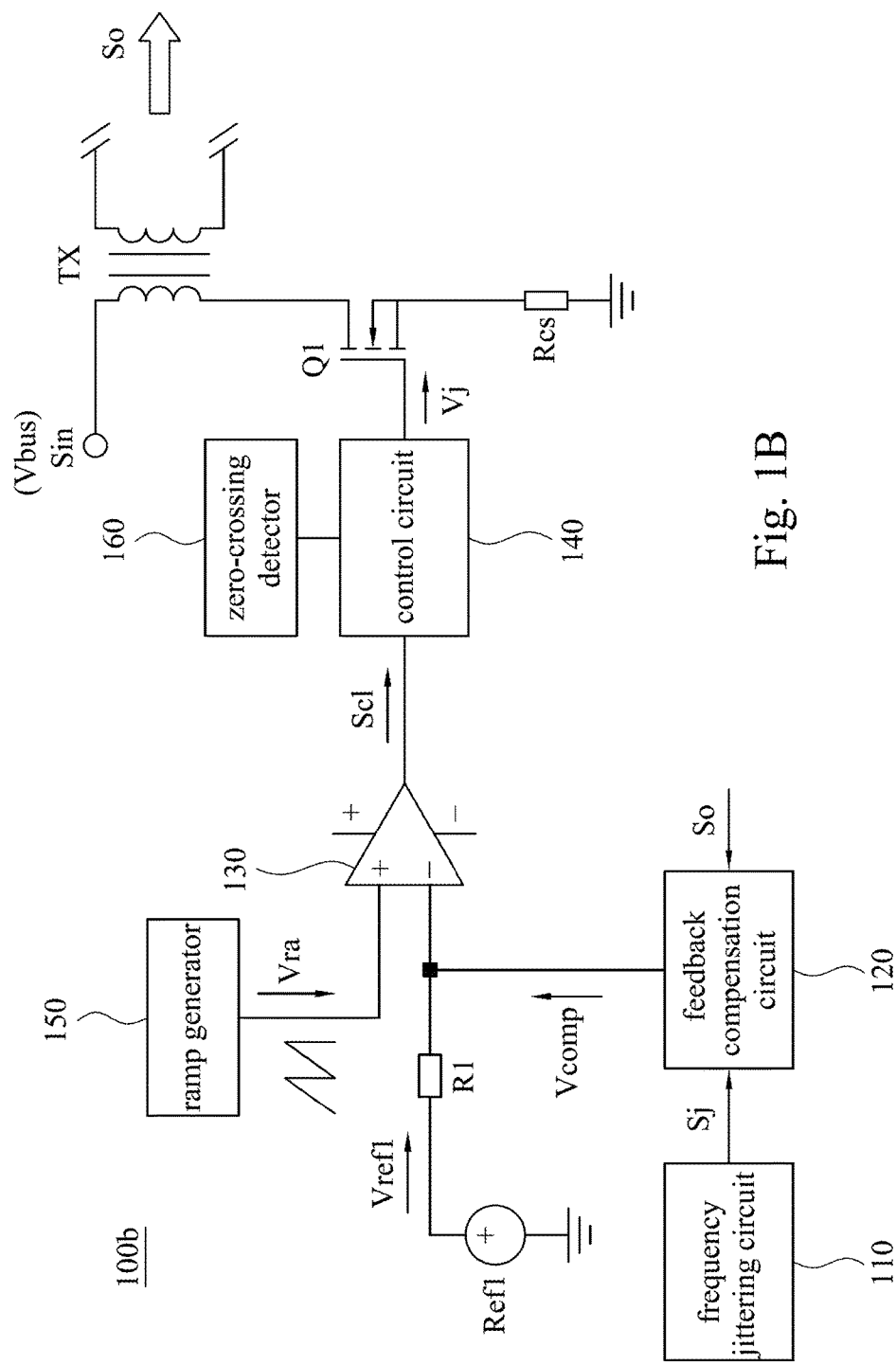
FIG. 1B is a schematic diagram of a power supply apparatus according to other embodiments of the present disclosure.

FIG. 1B is a schematic diagram of a power supply apparatus according to other embodiments of the present disclosure. As illustrated in FIG. 1B, the power supply apparatus 100b can further include a reference voltage source Ref1 and a ramp generator 150. The reference voltage source Ref1 is electrically coupled to the input terminal (e.g., the inverting input terminal) of the comparator 130 and configured to generate the reference voltage signal Vref1. The ramp generator 150 is electrically coupled to the other input terminal (e.g., the non-inverting input terminal) of the comparator 130 and configured to generate a ramp signal as the oscillation signal Vra.

Moreover, in other embodiments, as illustrated in FIG. 1B, the power supply apparatus 100b can further include a zero-crossing detector (ZCD) 160. The zero-crossing detector 160 is configured to detect if the output signal So of the power supply apparatus 100b reaches a threshold level (e.g., if the output voltage or output current reaches a threshold level), and configured to trigger the control circuit 140 outputting the frequency jittering control signal Vj when the output signal So reaches the threshold level, in order to switch the main switch Q1. In other words, the zero-crossing detector 160 can be configured to determine the turn-on time point of the main switch Q1, such that the power supply apparatus 100b operates in a threshold turn-on mode.

In further embodiments, the frequency jittering circuit 110 is integrated into the feedback compensation circuit 120 or integrated into other signal generating circuits, but it is not limited thereto.

In practice, the aforementioned power supply apparatus can be implemented by a converter (e.g., fly-back converter), or the aforementioned power supply apparatus can include converter(s). In addition, in some embodiments, the aforementioned power supply apparatus can be a pulse frequency modulation (PFM) power supply apparatus.

Figure 2:
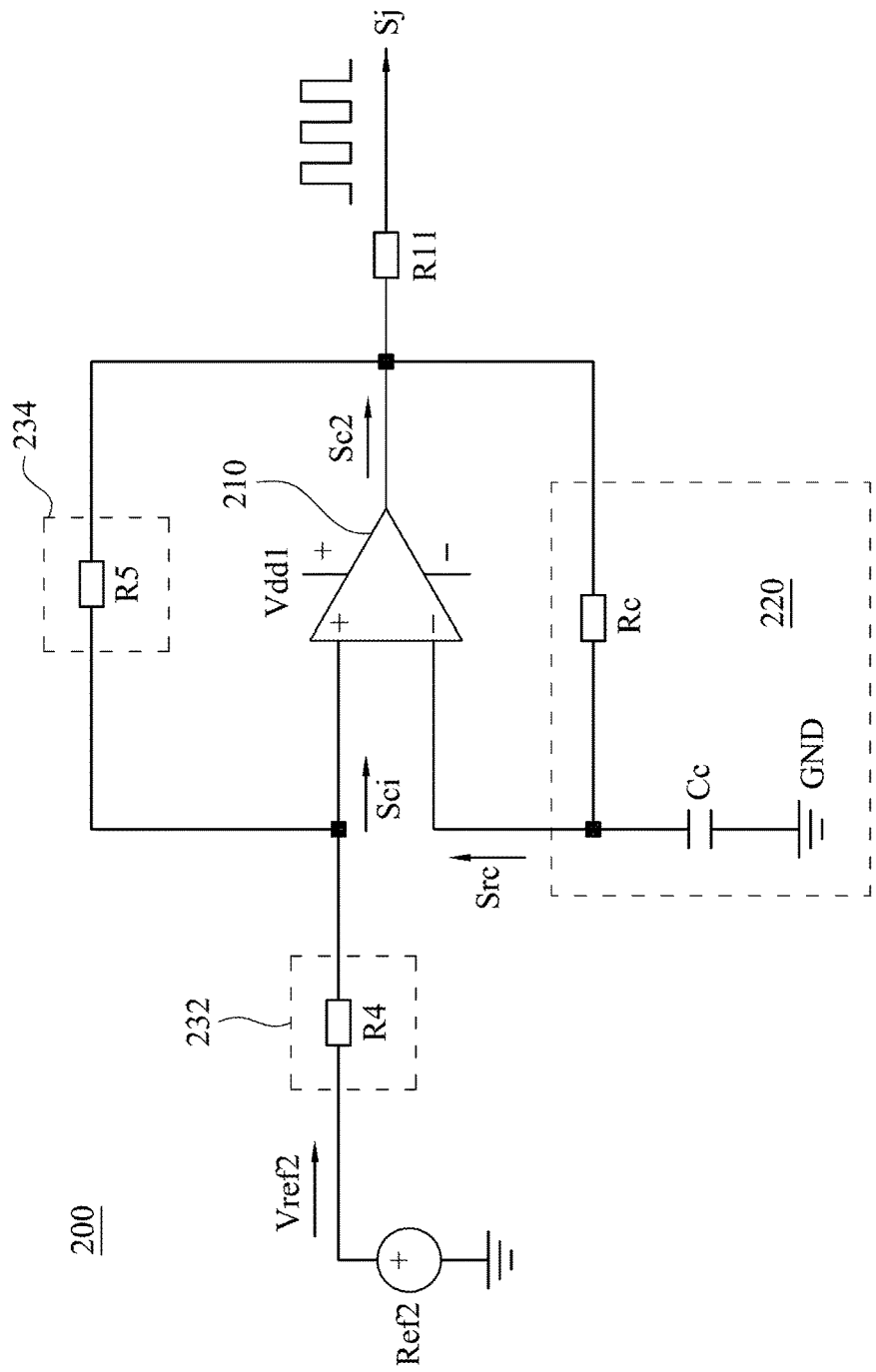
FIG. 2 is a schematic diagram of a frequency jittering circuit according to some embodiments of the present disclosure.

FIG. 2 is a schematic diagram of a frequency jittering circuit according to some embodiments of the present disclosure. The frequency jittering circuit 200 illustrated in FIG. 2 can be applied in the power supply apparatus 100a in FIG. 1A or the power supply apparatus 100b in FIG. 1B, but it is not limited thereto.

As illustrated in FIG. 2, the frequency jittering circuit 200 includes a comparator 210 and a charging/discharging unit 220. The comparator 210 is configured to compare a charging/discharging signal Src with a comparison input signal Sci to output a comparison output signal Sc2 as the frequency jittering signal Sj. The comparison input signal Sci is generated according to a combination of a reference voltage signal Vref2 and the comparison output signal Sc2. The charging/discharging unit 220 is configured to perform charging/discharging operations according to the comparison output signal Sc2, for correspondingly generating the charging/discharging signal Src. In practice, the comparator 210 can be implemented by an operational amplifier (OP).

In configuration, in one embodiment, the frequency jittering circuit 200 can further include a reference voltage source Ref2 and voltage drop units 232, 234. The reference voltage source Ref2 is configured to generate the reference voltage signal Vref2. The voltage drop unit 232 is electrically coupled between the reference voltage source Ref2 and an input terminal (e.g., a non-inverting input terminal) of the comparator 210. The voltage drop unit 234 is electrically coupled between the input terminal (e.g., the non-inverting input terminal) and an output terminal of the comparator 210. The charging/discharging unit 220 is electrically coupled between the other input terminal (e.g., an inverting input terminal) and the output terminal of the comparator 210.

In further embodiments, the charging/discharging unit 220 can include a capacitor Cc and a resistor Rc, in which the capacitor Cc is electrically coupled between the input terminal (e.g., the inverting input terminal) of the comparator 210 and a ground terminal GND, and the resistor Rc is electrically coupled between the input terminal (e.g., the inverting input terminal) and the output terminal of the comparator 210. Basically, the capacitor Cc and the resistor Rc are formed together as a charging/discharging loop which performs charging/discharging operations. In another embodiment, the voltage drop units 232 and 234 can include resistors R4 and R5, respectively.

In operation, when the voltage at the inverting input terminal of the comparator 210, i.e., the voltage across the capacitor Cc, is lower than the voltage at the non-inverting input terminal of the comparator 210, the comparator 210 outputs a high level signal (e.g., a signal having a level of a supply voltage Vdd1), in which the voltage at the non-inverting input terminal of the comparator 210 is equal to $Vdd1 \times R4/(R4+R5)+Vref2 \times R5/(R4+R5)$. Afterwards, the high level signal outputted by the comparator 210 charges the charging/discharging unit 220 (e.g., the capacitor Cc and the resistor Rc). When the capacitor Cc is charged such that the voltage across the capacitor Cc reaches to the voltage at the non-inverting input terminal of the comparator 210, the comparator 210 outputs a low level signal, in which the voltage at the non-inverting input terminal of the comparator 210 becomes equal to $Vref2 \times R5/(R5+R4)$. Then, since the comparator 210 outputs the low level signal, the capacitor Cc starts to perform the discharging operation. When the capacitor Cc is discharged such that the voltage across the capacitor Cc is lower than the voltage at the non-inverting input terminal of the comparator 210, the comparator 210 then outputs the high level signal again. The aforementioned operations are performed repeatedly and the rest may be deduced by analogy, in order to form a square wave signal with low frequency, as the frequency jittering signal Sj.

In practice, the supply voltage Vdd1 for the comparator 210, the reference voltage source Ref2, RC circuit parameters associated with the capacitor Cc and the resistor Rc, and resistance values of the resistors R4 and R5, can be configured to determine the frequency of the frequency jittering signal Sj. In some embodiments, the amplitude of the frequency jittering signal Sj can be determined by the supply voltage Vdd1 and the voltage drop device (e.g., the resistor R11), which is coupled to the output of the comparator 210, and even can be determined together by the impedance of the circuit (e.g., the feedback compensation circuit 120) coupled to the output of the comparator 210. As a result, the disturbance amount can be adaptively and flexibly adjusted according to the aforementioned parameters.

In an example of operation, the supply voltage Vdd1 is approximately 11 Volts, the reference voltage source Ref2 provides a voltage of approximately 2.5 Volts, the capacitance value of the capacitor Cc is approximately 0.47 uF, the resistance value of the resistor Rc is approximately 36 Kohms, the resistance value of the resistor R4 is approximately 93 Kohms, the resistance value of the resistor R5 is approximately 48 Kohms, in which the RC time constant associated with the capacitor Cc and the resistor Rc is approximately 17 millisecond (ms). Illustratively, the parameter range of the capacitor Cc and the resistor Rc can be determined and chosen according to practical needs of one of ordinary skill in the art, if the frequency of the frequency jittering signal Sj is lower than the switching frequency (e.g., the switching frequency of the main switch Q1 illustrated in FIG. 1A).

Figure 3:
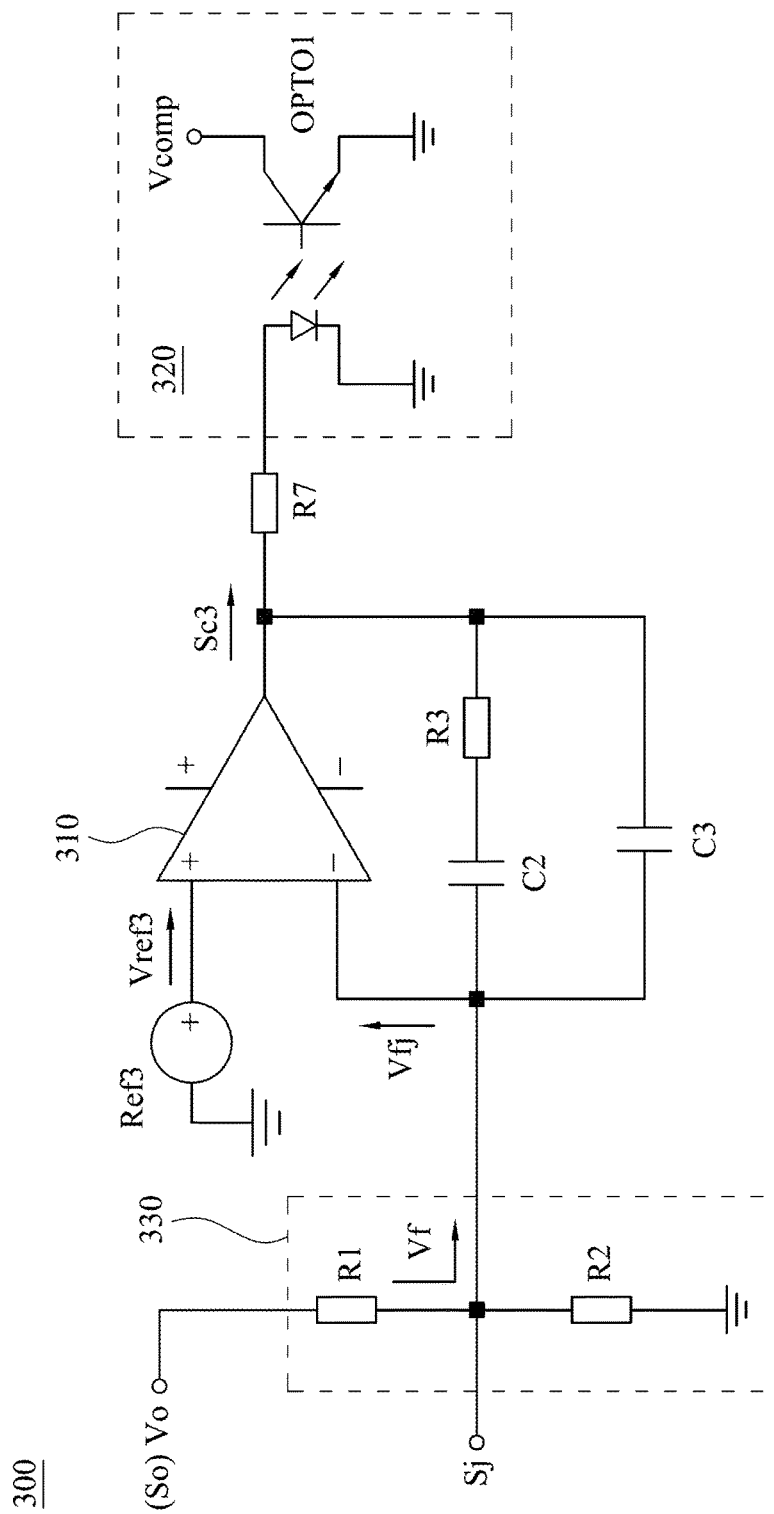
FIG. 3 is a schematic diagram of a feedback compensation circuit according to some embodiments of the present disclosure.

FIG. 3 is a schematic diagram of a feedback compensation circuit according to some embodiments of the present disclosure. The feedback compensation circuit 300 illustrated in FIG. 3 can be applied in the power supply apparatus 100a in FIG. 1A or the power supply apparatus 100b in FIG. 1B, but it is not limited thereto. In addition, for convenience and clarity of illustration, in the present embodiment, the output signal So received by the feedback compensation circuit 300 is configured, for example, as an output voltage signal Vo, but it is not limited thereto. In practice, the feedback compensation circuit 300 can be a constant voltage type feedback compensation circuit, which outputs a constant voltage.

As illustrated in FIG. 3, the feedback compensation circuit 300 includes a comparator 310 and a feedback unit 320. The comparator 310 is configured to compare a frequency jittering feedback signal Vfj with a reference voltage signal Vref3 to output a comparison output signal Sc3, in which the frequency jittering feedback signal Vfj is generated by a superimposition of the frequency jittering signal Sj and a feedback signal Vf, and the feedback signal Vf is derived by detecting the output voltage signal Vo. The feedback unit 320 is configured to receive the comparison output signal Sc3, and to generate the feedback compensation signal Vcomp corresponding to the comparison output signal Sc3, and transmits the feedback compensation signal Vcomp to the comparator 130 illustrated in FIG. 1A. In practice, the comparator 310 can be implemented by an operational amplifier (OP).

In configuration, in one embodiment, the feedback compensation circuit 300 can further include a reference voltage source Ref3 and a detection unit 330. The reference voltage source Ref3 is configured to generate the reference voltage signal Vref3. The detection unit 330 is configured to detect the output voltage signal Vo to generate the feedback signal Vf, such that the feedback signal Vf is superimposed on the frequency jittering signal Sj, and the superimposition of the frequency jittering signal Sj and the feedback signal Vf is transmitted to the comparator 310.

In further embodiments, the detection unit 330 can be a voltage dividing unit, which further includes resistors R1 and R2. The output voltage signal Vo is voltage-divided by the resistors R1 and R2, such that the feedback signal Vf as a voltage dividing signal is generated.

Moreover, in regard to the comparator 310, the output terminal of the comparator 310 is configured to output the comparison output signal Sc3, an input terminal (e.g., a non-inverting input terminal) of the comparator 310 is electrically coupled to the reference voltage source Ref3, and the other input terminal (e.g., an inverting input terminal) of the comparator 310 is electrically coupled to the detection unit 330 and the output terminal of the comparator 210 illustrated in FIG. 2 and is configured to receive the frequency jittering feedback signal Vfj which is generated by the superimposition of the frequency jittering signal Sj and the feedback signal Vf. As a result, low-frequency perturbations can be added into the feedback signal Vf, such that the feedback compensation signal Vcomp has low-frequency perturbations therein.

Furthermore, as illustrated in FIG. 3, the feedback compensation circuit 300 can further include a loop compensation network having a resistor R3 and capacitors C2 and C3, which is electrically coupled to the input terminal (e.g., the inverting input terminal) and the output terminal of the comparator 310.

In configuration, in other embodiments, the feedback unit 320 can further include an opto-coupler OPTO1, which is configured to generate the feedback compensation signal Vcomp according to the comparison output signal Sc3, where an input terminal of the opto-coupler OPTO1 is electrically coupled to the output terminal of the comparator 310, and an output terminal of the opto-coupler OPTO1 is electrically coupled to the input terminal (e.g., the inverting input terminal) of the comparator, e.g., the comparator 130 as illustrated in FIG. 1A.

In operation, if there is no perturbation (e.g., no frequency jittering signal Sj), the feedback compensation signal Vcomp is substantially a direct-current (DC) signal without ripples; contrarily, if the frequency jittering signal Sj is added, the feedback compensation signal Vcomp has ripples. When the frequency jittering signal Sj is at high level, the frequency jittering feedback signal Vfj which is generated by the superimposition of the frequency jittering signal Sj and the feedback signal Vf is at high level. Therefore, the comparison output signal Sc3 outputted by the comparator 310 is at low level. As a result, the current conveyed to the output side in the opto-coupler OPTO1 is small, and the feedback compensation signal Vcomp is at high level.

Figure 4:
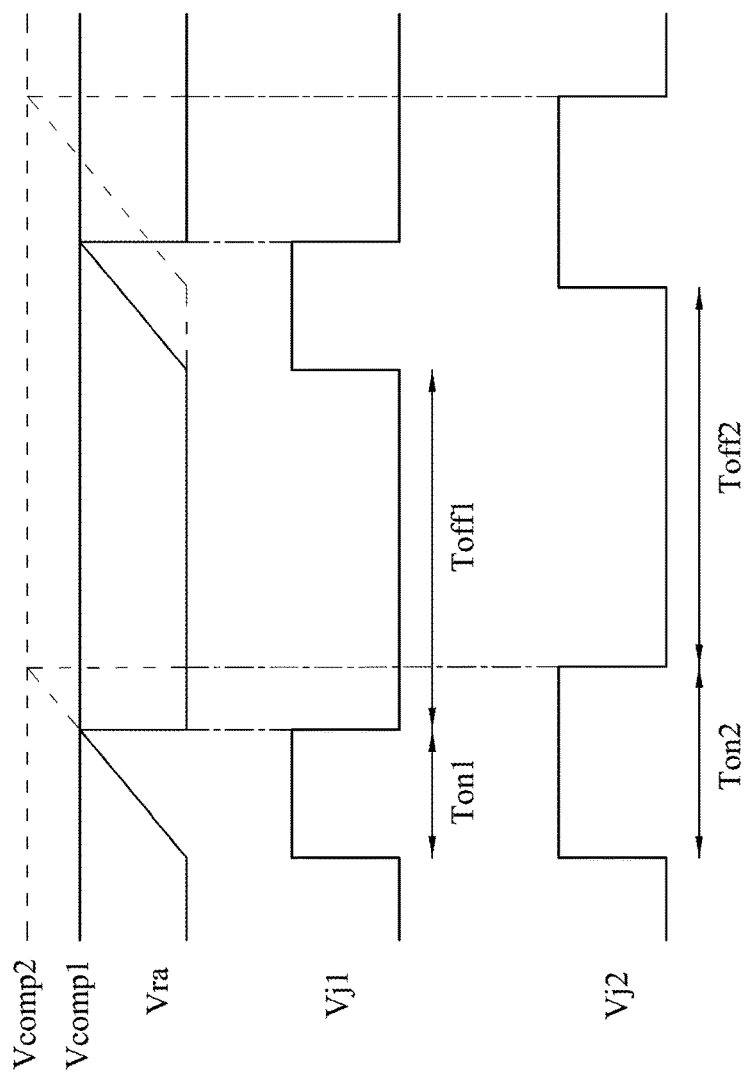
FIG. 4 is a waveform diagram of the frequency jittering control signal together with the oscillation signal and the feedback compensation signal corresponding thereto as illustrated in FIG. 1A, according to some embodiments of the present disclosure.

FIG. 4 is a waveform diagram of the frequency jittering control signal together with the oscillation signal and the feedback compensation signal corresponding thereto as illustrated in FIG. 1A, according to some embodiments of the present disclosure. As illustrated in FIG. 1A and FIG. 4, in the duration of the oscillation signal Vra rising to a corresponding level Vcomp1, the comparator 130 compares the feedback compensation signal Vcomp (having the corresponding level Vcomp1) with the oscillation signal Vra to output the comparison output signal Sc1, and the control circuit 140 outputs a frequency jittering control signal Vj1 according to the comparison output signal Sc1, such that the frequency jittering control signal Vj1 is generated and has a corresponding waveform. Moreover, in the condition that the rising slope of the oscillation signal Vra is constant, when the level of the feedback compensation signal Vcomp increases from Vcomp1 to Vcomp2, the oscillation signal Vra requires more time to rise to the corresponding level Vcomp2, the comparator 130 compares the feedback compensation signal Vcomp (having the corresponding level Vcomp2) with the oscillation signal Vra to output the comparison output signal Sc1, and the control circuit 140 outputs a frequency jittering control signal Vj2 according to the corresponding comparison output signal Sc1, such that the frequency jittering control signal Vj2 is correspondingly generated and has a corresponding waveform. As illustrated in FIG. 3, the level Vcomp1 is a level corresponding to the frequency jittering signal Sj with lower level, and the level Vcomp2 is a level corresponding to the frequency jittering signal Sj with higher level. Based on the aforementioned illustration, when the level of the feedback compensation signal Vcomp increases from Vcomp1 to Vcomp2, the frequency of the frequency jittering control signal Vj decreases from fs1=1/(Ton1+Toff1) to fs2=1/(Ton2+Toff2), to implement the manner of frequency jittering control, so as to change the switching frequency of the main switch Q1 and to further improve EMI characteristics of the power supply apparatus effectively.

Illustratively, variations of the frequency jittering signal Sj can also be utilized to increase the frequency of the frequency jittering control signal Vj; in other words, when the frequency jittering signal Sj is small or has a relatively lower level, the feedback compensation signal Vcomp has also a relatively lower level (e.g., the level Vcomp1). At the moment, corresponding to the feedback compensation signal Vcomp with the lower level (e.g., the level Vcomp1), related circuits can be configured to generate the corresponding oscillation signal Vra, such that the rising slope of the oscillation signal Vra becomes greater and the frequency of the oscillation signal Vra increases, further resulting in that the frequency of the frequency jittering control signal Vj increases. Based on the above, the embodiments illustrated in FIG. 4 are only given for illustrative purposes, and thus the present disclosure is not limited thereto.

On the other hand, in other embodiments, as illustrated in FIG. 3, the frequency jittering signal Sj also can be added into the reference voltage signal Vref3 to generate a frequency jittering reference signal, in which the frequency jittering reference signal is compared with the feedback signal Vf by the comparator 310, such that the comparator 310 outputs the corresponding comparison output signal Sc3. Operations of other devices are similar to those illustrated in the aforementioned embodiments, and thus they are not further detailed herein.

Illustratively, the frequency jittering signal Sj also can be added into other signals in the feedback compensation circuit or added into other feedback networks, and thus the present disclosure is not limited to the aforementioned embodiments.

Figure 5:
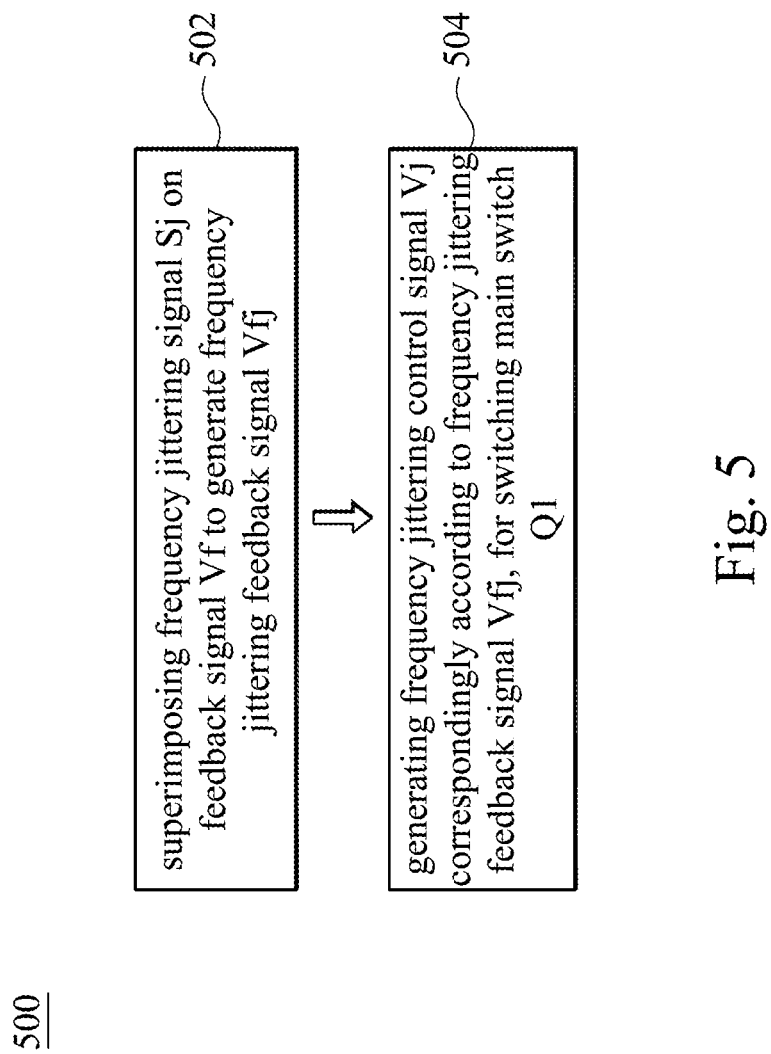
FIG. 5 is a flow chart of a frequency jittering control method according to some embodiments of the present disclosure.

Another aspect of the present disclosure is related to a frequency jittering control method. FIG. 5 is a flow chart of a frequency jittering control method according to some embodiments of the present disclosure. The frequency jittering control method 500 illustrated in FIG. 5 can be applied in the power supply apparatus in the aforementioned embodiments. For convenience and clarity of illustration, the frequency jittering control method 500 in the present embodiment is explained with the aforementioned embodiments illustrated in FIGS. 1A-3, but it is not limited thereto.

First, in step 502, the frequency jittering signal Sj is superimposed on the feedback signal Vf to generate the frequency jittering feedback signal Vfj, in which the feedback signal Vf is derived by detecting the output signal So (or the output voltage signal Vo) of the power supply apparatus 100a, as illustrated in FIG. 3. Then, in step 504, the frequency jittering control signal Vj is generated correspondingly according to the frequency jittering feedback signal Vfj, for switching the main switch Q1 in the power supply apparatus 100a, such that the power supply apparatus 100a generates the output signal So correspondingly, as illustrated in FIG. 3.

In one embodiment, the frequency jittering control method 500 can further include the following advanced operations. As illustrated in FIG. 2, the charging/discharging signal Src is compared with the comparison input signal Sci to output the comparison output signal Sc2, which is used as the frequency jittering signal Sj. The comparison input signal Sci is generated according to the combination of the reference voltage signal Vref2 and the comparison output signal Sc2. Afterwards, charging/discharging operations are performed according to the comparison output signal Sc2, for correspondingly generating the charging/discharging signal Src.

In another embodiment, the step 504 can further include the following operations. As illustrated in FIG. 3, the feedback compensation signal Vcomp is generated according to the frequency jittering feedback signal. Then, as illustrated in FIG. 1A, the oscillation signal Vra is compared with the superimposition of the feedback compensation signal Vcomp and the reference voltage signal Vref1, to generate the comparison output signal Sc1. The control circuit 140 is then controlled, according to the comparison output signal Sc1, to generate the frequency jittering control signal Vj.

In further embodiments, the operation of generating the feedback compensation signal Vcomp according to the frequency jittering feedback signal Vfj can include the following operations. As illustrated in FIG. 3, the frequency jittering feedback signal Vfj is compared with the reference voltage signal Vref3 to generate the comparison output signal Sc3, and then the comparison output signal Sc3 is fed back as the feedback compensation signal Vcomp.

Figure 6:
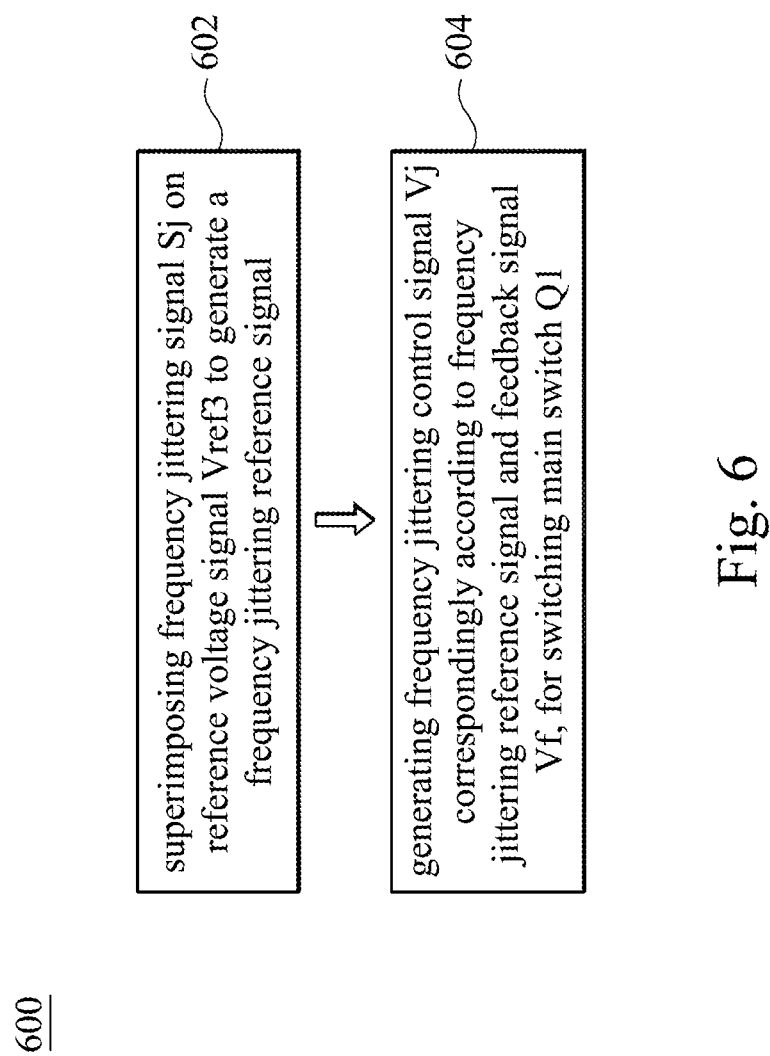
FIG. 6 is a flow chart of a frequency jittering control method according to some other embodiments of the present disclosure.

FIG. 6 is a flow chart of a frequency jittering control method according to some other embodiments of the present disclosure. The frequency jittering control method 600 illustrated in FIG. 6 can be applied in the power supply apparatus in the aforementioned embodiments. For convenience and clarity of illustration, the frequency jittering control method 600 in the present embodiment is explained with the aforementioned embodiments illustrated in FIGS. 1A-3, but it is not limited thereto.

First, in step 602, as illustrated in FIG. 3, the frequency jittering signal Sj is superimposed on the reference voltage signal Vref3 to generate a frequency jittering reference signal (not shown). Afterwards, in step 604, as illustrated in FIG. 1 and FIG. 3, the frequency jittering control signal Vj is generated correspondingly according to the frequency jittering reference signal and the feedback signal Vf, for switching the main switch Q1 in the power supply apparatus 100a, such that the power supply apparatus 100a generates the output signal So correspondingly, in which the feedback signal Vf is derived by detecting the output signal So (or the output voltage signal Vo) of the power supply apparatus 100a.

In one embodiment, the frequency jittering control method 600 can further include the following advanced operations. As illustrated in FIG. 2, the charging/discharging signal Src is compared with the comparison input signal Sci to output the comparison output signal Sc2, which is used as the frequency jittering signal Sj. The comparison input signal Sci is generated according to the combination of the reference voltage signal Vref2 and the comparison output signal Sc2. Afterwards, charging/discharging operations are performed according to the comparison output signal Sc2, for correspondingly generating the charging/discharging signal Src.

In another embodiment, the step 604 can further include the following operations. As illustrated in FIG. 3, the feedback compensation signal Vcomp is generated according to the frequency jittering reference signal and the feedback signal Vf. Then, as illustrated in FIG. 1A, the oscillation signal Vra is compared with the superimposition of the feedback compensation signal Vcomp and the reference voltage signal Vref1, to generate the comparison output signal Sc1. The control circuit 140 is then controlled, according to the comparison output signal Sc1, to generate the frequency jittering control signal Vj.

In further embodiments, the operation of generating the feedback compensation signal Vcomp according to the frequency jittering reference signal and the feedback signal Vf can include the following operations. As illustrated in FIG. 3, the frequency jittering feedback signal Vfj is compared with the feedback signal Vf to generate the comparison output signal Sc3, and then the comparison output signal Sc3 is fed back to be as the feedback compensation signal Vcomp.

The operations are not necessarily recited in the sequence in which the steps are performed. That is, unless the sequence of the operations is expressly indicated, the sequence of the operations is interchangeable, and all or part of the operations may be simultaneously, partially simultaneously, or sequentially performed. The flow charts illustrated in FIG. 5 and FIG. 6 are only given for illustrative purposes, but not limiting of the present disclosure.

As can be known from the aforementioned embodiments, the aforementioned embodiments of the present disclosure can be applied to effectively improve EMI characteristics of the power supply apparatus. Furthermore, the addition of frequency jittering and the amount thereof can be adjusted according to practical EMI characteristics, and thus, even if the power supply apparatus is in the situation that input/output conditions are totally constant (e.g., the input is a DC voltage, and the output is a constant voltage for load) such that the switching frequency is constant, the frequency jittering operation also can be realized, further improving EMI characteristics of the power supply apparatus effectively. Moreover, the aforementioned embodiments of the present disclosure can be applied to realize the frequency jittering control operation outside integrated circuit (IC), thus avoiding the limitation that the frequency jittering control operation has to be realized inside integrated circuit (IC). As a result, the frequency jittering control operation can be adaptively and flexibly adjusted according to practical needs.

As is understood by one of ordinary skill in the art, the foregoing embodiments of the present disclosure are illustrative of the present disclosure rather than limiting of the present disclosure. It is intended to cover various modifications and similar arrangements included within the spirit and scope of the appended claims, the scope of which should be accorded with the broadest interpretation so as to encompass all such modifications and similar structures.

What is claimed is:

1. A frequency jittering control circuit comprising:
    a frequency jittering circuit configured to generate a frequency jittering signal;
    a feedback compensation circuit coupled to the frequency jittering circuit to receive the frequency jittering signal and to receive an output signal of a power supply apparatus, wherein the feedback compensation circuit generates a feedback compensation signal in response to the frequency jittering signal and the output signal;
    a first comparator having an inverting input terminal, a non-inverting input terminal and an output terminal, wherein the first comparator coupled to the feedback compensation circuit to output a first comparison output signal through the output terminal according to the feedback compensation signal and a reference signal in the inverting input terminal and an oscillation signal in the non-inverting input terminal; and
    a control circuit coupled to the first comparator to output a frequency jittering control signal to switch a main switch in the power supply apparatus according to the first comparison output signal, such that the power supply apparatus generates the output signal correspondingly, wherein the frequency jittering control signal generated by the control circuit does not affect the frequency jittering circuit to generate the frequency jittering signal,
    wherein the feedback compensation circuit comprises:
        a detection unit for receiving the frequency jittering signal and a feedback signal which is derived by detecting the output signal, wherein the detection unit generate a frequency jittering feedback signal by the frequency jittering signal adding the feedback signal;
        a third comparator configured to compare the frequency jittering feedback signal with a second reference voltage signal to output a third comparison output signal; and
        a feedback unit configured to receive the third comparison output signal, and generate and transmit the feedback compensation signal to the first comparator, wherein the feedback unit comprising an opto-coupler, wherein an input terminal of the opto-coupler is electrically coupled to an output terminal of the third comparator, and an output terminal of the opto-coupler is electrically coupled to the inverting input terminal of the first comparator.

2. The frequency jittering control circuit as claimed in claim 1, wherein the frequency jittering circuit comprises:
    a second comparator configured to compare a charging/discharging signal with a comparison input signal to output a second comparison output signal as the frequency jittering signal, wherein the comparison input signal is generated according to a combination of a first reference voltage signal and the second comparison output signal; and
    a charging/discharging unit configured to perform charging/discharging operations according to the second comparison output signal, for correspondingly generating the charging/discharging signal.

3. The frequency jittering control circuit as claimed in claim 1, wherein an input terminal of the first comparator is configured to receive the oscillation signal, and the other input terminal of the first comparator is configured to receive the feedback compensation signal and a reference voltage signal.

4. The frequency jittering control circuit as claimed in claim 3, further comprising:
    a ramp generator configured to generate a ramp signal as the oscillation signal.

5. The frequency jittering control circuit as claimed in claim 3, further comprising:
    a zero-crossing detector configured to detect if the output signal of the power supply apparatus reaches a threshold level, and configured to trigger the control circuit outputting the frequency jittering control signal when the output signal reaches the threshold level.

6. The frequency jittering control circuit as claimed in claim 1, wherein the frequency jittering circuit comprises:
    a first reference voltage source;
    a second comparator having a first input terminal, a second input terminal and an output terminal, wherein the output terminal is configured to output a second comparison output signal as the frequency jittering signal;
    a first voltage drop unit electrically coupled between the first input terminal and the first reference voltage source;
    a second voltage drop unit electrically coupled between the first input terminal and the output terminal; and
    a charging/discharging unit electrically coupled to the second input terminal and the output terminal.

7. The frequency jittering control circuit as claimed in claim 6, wherein the charging/discharging unit comprises:
    a capacitor electrically coupled to the second input terminal; and a resistor electrically coupled between the second input terminal and the output terminal.

8. The frequency jittering control circuit as claimed in claim 6, wherein the feedback compensation circuit comprises:
a second reference voltage source;
the third comparator having a first input terminal electrically coupled to the second reference voltage source, a second input terminal electrically coupled to the output terminal of the second comparator, and an output terminal configured to output the third comparison output signal; and
the detection unit configured to detect the output signal to generate and transmit the feedback signal to the second input terminal of the third comparator.

9. The frequency jittering control circuit as claimed in claim 6, further comprising:
a ramp generator and a third reference voltage source, wherein the first comparator comprises a first input terminal electrically coupled to the ramp generator, and a second input terminal electrically coupled to the third reference voltage source and configured to receive the feedback compensation signal.

10. The frequency jittering control circuit as claimed in claim 9, further comprising:
a zero-crossing detector configured to detect if the output signal of the power supply apparatus reaches a threshold level, and configured to trigger the control circuit outputting the frequency jittering control signal when the output signal reaches the threshold level.

11. The frequency jittering control circuit as claimed in claim 1, wherein the frequency jittering circuit is integrated into the feedback compensation circuit.

12. A frequency jittering control method comprising:
receiving a frequency jittering signal outputted by a frequency jittering circuit and a feedback signal which is derived by detecting an output signal of a power supply apparatus;
adding the frequency jittering signal on the feedback signal to generate a frequency jittering feedback signal by a feedback compensation circuit, and the feedback compensation circuit is coupled to the frequency jittering circuit to receive the frequency jittering signal; and
generating a frequency jittering control signal correspondingly according to the frequency jittering feedback signal, for switching a main switch in the power supply apparatus, such that the power supply apparatus generates the output signal correspondingly, wherein the frequency jittering control signal does not affect to generate the frequency jittering signal,
wherein generating the frequency jittering control signal according to the frequency jittering feedback signal further comprises:
comparing the frequency jittering feedback signal with a third reference voltage signal to generate a third comparison output signal by a first comparator;
receiving the third comparison output signal to generate a feedback compensation signal by an opto-coupler;
comparing an oscillation signal in a non-inverting input terminal with the feedback compensation signal adding a second reference voltage signal in an inverting input terminal to generate a second comparison output signal by a second comparator, wherein an input terminal of the opto-coupler is electrically coupled to an output terminal of the first comparator, and an output terminal of the opto-coupler is electrically coupled to the inverting input terminal of the second comparator; and
controlling a control circuit to generate the frequency jittering control signal, according to the second comparison output signal.

13. The frequency jittering control method as claimed in claim 12, further comprising:
comparing a charging/discharging signal with a comparison input signal to output a first comparison output signal as the frequency jittering signal, wherein the comparison input signal is generated according to a combination of a first reference voltage signal and the first comparison output signal; and
performing charging/discharging operations according to the first comparison output signal, for correspondingly generating the charging/discharging signal.

\* \* \* \* \*